(12) United States Patent
Ohta et al.

(10) Patent No.: US 6,246,649 B1
(45) Date of Patent: Jun. 12, 2001

(54) OPTICAL DISC REPRODUCING APPARATUS AND METHOD

(75) Inventors: Shinji Ohta; Hitoshi Sakaguchi; Kazushi Yoshikawa, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/201,437

(22) Filed: Nov. 30, 1998

(30) Foreign Application Priority Data

Dec. 1, 1997 (JP) .................................................. 9-330434

(51) Int. Cl.⁷ ........................................................ G11B 7/00
(52) U.S. Cl. ...................................... 369/47.28; 369/47.36; 369/53.1
(58) Field of Search .................................... 369/47, 48, 49, 369/50, 54, 58, 59, 32, 275.1, 275.3, 275.4; 360/48, 51, 53

(56) References Cited

U.S. PATENT DOCUMENTS

| | | | |
|---|---|---|---|
| 5,703,851 | * 12/1997 | Ando | 369/47 |
| 5,848,050 | * 12/1998 | Nagasawa et al. | 369/275.4 |
| 5,870,375 | * 2/1999 | Maeda et al. | 369/50 X |

* cited by examiner

*Primary Examiner*—Muhammad Edun
(74) *Attorney, Agent, or Firm*—Oblon, Spivak, McClelland, Maier & Neustadt, P.C.

(57) ABSTRACT

The optical disc reproducing apparatus comprises an ATIP demodulator which is supplied, from a matrix amplifier, with a wobble signal incorporating an address information in a modulated component thereof. In the ATIP demodulator, the free-run frequencies of the pair of VCOs change correspondingly to a moved position of a sled. Therefore, the ATIP demodulator can work well even if the carrier frequency of the wobble signal changes.

9 Claims, 5 Drawing Sheets

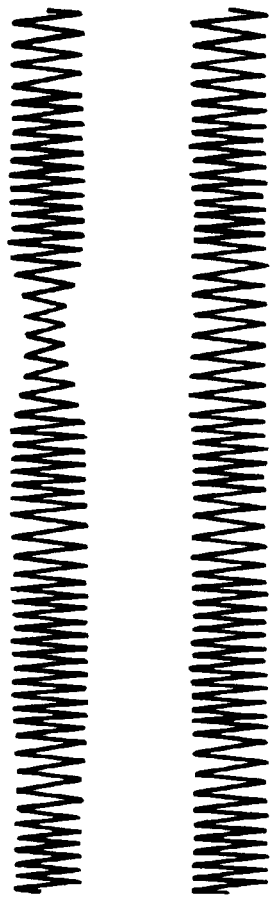
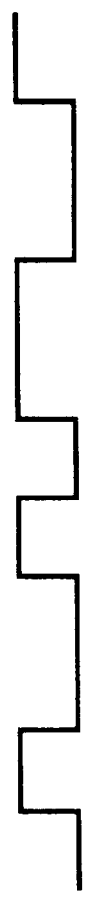
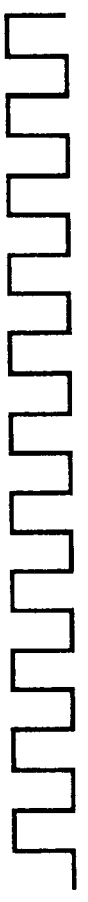
FIG.5A WOBBLE SIGNAL (AT TERMINAL A)
FIG.5B WOBBLE SIGNAL AFTER SUBJECTED TO AGC (AT TERMINAL B)
FIG.5C SIGNAL AFTER DEMODULATED (AT TERMINAL C)
FIG.5D ADDRESS DATA (AT TERMINAL D)
FIG.5E BIT CLOCK (AT TERMINAL E)

OPTICAL DISC REPRODUCING APPARATUS AND METHOD

BACKGROUND OF THE INVENTION

1. Field of the Invention

The present invention relates to an apparatus for, and method of, reproducing an optical disc driven by the CAV (Constant Angular Velocity) method.

2. Description of Related Art

To reproduce data from an optical disc, the optical disc is driven to spin by either the well-known CAV (Constant Angular Velocity) or CLV (Constant Linear Velocity) method.

The CAV method is such that data is recorded into or reproduced from an optical disc being driven to spin at a constant angular velocity. An optical disc in which data has been recorded by the CAV method (will be referred to as "CAV disc" -hereinafter) has sectors as minimum data recording/reproducing units, radially formed and is featured by a rapid access to data for recording or reproduction.

The CLV method is such that data is recorded into, or reproduced from, an optical disc being spun at a constant linear velocity in relation to a recording/reproducing head. An optical disc in which data has been recorded by the CLV method (will be referred to as "CLV disc" -hereinafter) has a constant data recording density over an area from outer perimeter to inner perimeter and is capable of recording a large amount of data. Also well known is an optical disc having guide grooves called "pre-grooves" formed thereon. When data is reproduced from such an optical disc having pre-grooves formed thereon, laser beam components from opposite edges of a pre-groove are detected from a reflected laser beam and tracking servo control can be performed so that the laser beam is irradiated to the middle between the pre-groove edges.

Further an optical disc is well known in which a slightly meandering pre-groove is formed on the basis of a wobble signal generated by modulating a predetermined center frequency. The modulated component of this wobble signal contains a physical address information of a position where this wobble signal is recorded, etc. In the optical disc recording/reproducing apparatus, the wobble signal can be detected from a signal of a difference between the laser beam components from opposite edges of the pre-groove, a so-called a pushpull signal.

If such a wobble signal is recorded in a CAV disc such mentioned above, it is detected with the optical disc spun at a constant angular velocity, whereby a modulated component can be extracted from a carrier of a predetermined center frequency.

In case such a wobble signal is recorded in a CLV disc such as mentioned above, it is detected with the disc spun at a constant linear velocity, whereby a modulated component can be extracted from a carrier of a predetermined center frequency.

It will be considered here that for a rapid access to a CLV disc, the disc is spun at a constant angular velocity as in the case of a CAV disc.

In this case, however, when a wobble signal is detected from the CLV disc being spun at the constant angular velocity, the center frequency of the detected wobble signal will vary at each radial position on the CLV disc. For example, there will be a difference of about 2.5 times in linear velocity between the inner and outer perimeters of the CLV disc. Therefore, there will be a difference of about 2.5 times in center frequency of the wobble signal between the inner and outer perimeters of the CLV disc.

To demodulate the wobble signal, the ordinary optical disc drives employs a PLL (phase locked loop) circuit, filter circuit, etc. whose operating frequencies are fixed. Therefore, it is difficult to demodulate a wobble signal whose center frequency varies.

SUMMARY OF THE INVENTION

Accordingly, the present invention has an object to overcome the above-mentioned drawbacks of the prior art by providing an optical disc reproducing apparatus and method in which a wobble signal recorded in a CLV disc can be reproduced from the CLV disc being spun at a constant angular speed.

The above object can be attained by providing an optical disc reproducing apparatus comprising, according to the present invention, means for driving to spin at a constant angular velocity an optical disc having recorded at a constant linear velocity a wobble signal produced through frequency modulation of a predetermined center frequency by forming slightly meandering pre-grooves for recording tracks; an optical pickup adapted to be movable radially of the optical disc; means for demodulating, on the basis of a set frequency, the wobble signal detected by the optical pickup from the optical disc; and a controlling means for changing the set frequency in the demodulating means on the basis of a disc-radially moved position of the optical pickup.

In the optical disc reproducing apparatus according to the present invention, the set frequency may be changed on the basis of the moved position of the optical pickup, the optical disc having a data recorded therein while being spun at the constant linear velocity be spun at the constant angular velocity, and the wobble signal recorded in the optical disc may be demodulated with a signal based the set frequency taken as a carrier.

The above object can also be achieved by providing a method of reproducing a signal recorded in an optical disc with the optical disc spun at a constant angular velocity, comprising, according to the present invention, the steps of driving to spin at a constant angular velocity the optical disc having recorded therein, while being driven to spin at a constant linear velocity, a wobble signal produced through frequency modulation of a predetermined center frequency by forming slightly meandering pre-grooves for recording tracks; changing a set frequency on the basis of a disc-radially moved position of an optical pickup; and demodulating the wobble signal on the basis of the set frequency.

In the optical disc reproducing method according to the present invention, the set frequency may be changed on the basis of the moved position of the optical pickup, the optical disc having a data recorded therein while being spun at the constant linear velocity be spun at the constant angular velocity, and the wobble signal recorded in the optical disc may be demodulated with a signal based on the set frequency taken as a carrier.

BRIEF DESCRIPTION OF THE DRAWINGS

These objects and other objects, features and advantages of the present intention will become more apparent from the following detailed description of the present invention applied to an optical disc reproducing apparatus when taken in conjunction with the accompanying drawings.

FIGS. 5A, 5B, 5C, 5D and 5E shows waveforms of signals delivered at terminals of the ATIP demodulator in FIG. 4.

DETAILED DESCRIPTION OF THE PREFERRED EMBODIMENTS

Figure 1:
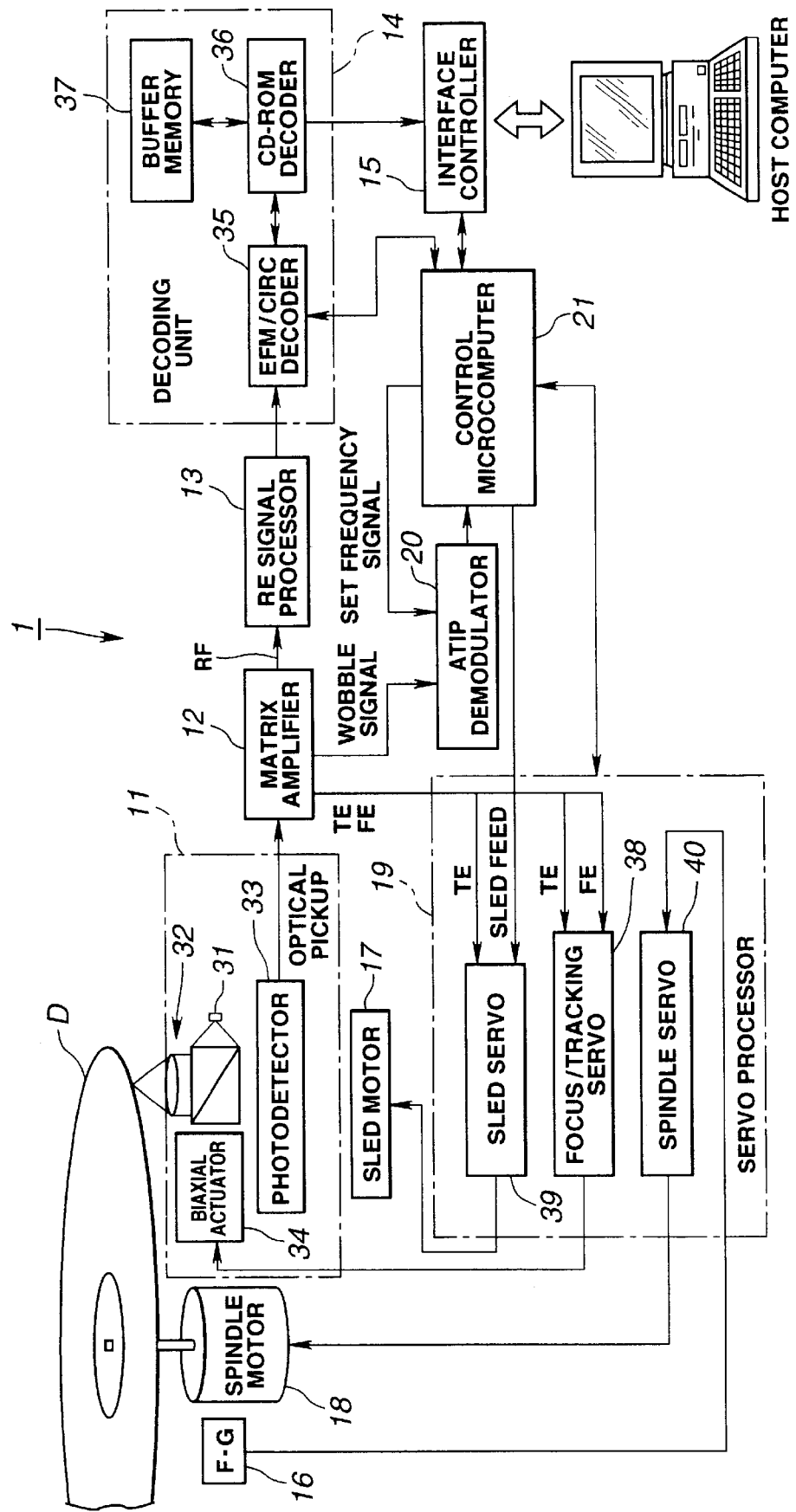
FIG. 1 is a block diagram of the optical disc reproducing apparatus according to the present invention.

Referring now to FIG. 1, there is illustrated in the form of a block diagram an embodiment of the optical disc reproducing apparatus to which the present invention is applied.

In FIG. 1, the optical disc reproducing apparatus is generally indicated with a reference 1. The optical disc reproducing apparatus 1 is adapted to reproduce data recorded in an optical disc D into which data can be written only once (such as CD-Recordable).

First, the optical disc D (CD-R) to be reproduced by the optical disc reproducing apparatus will be described herebelow with reference to FIG. 2.

Figure 2:
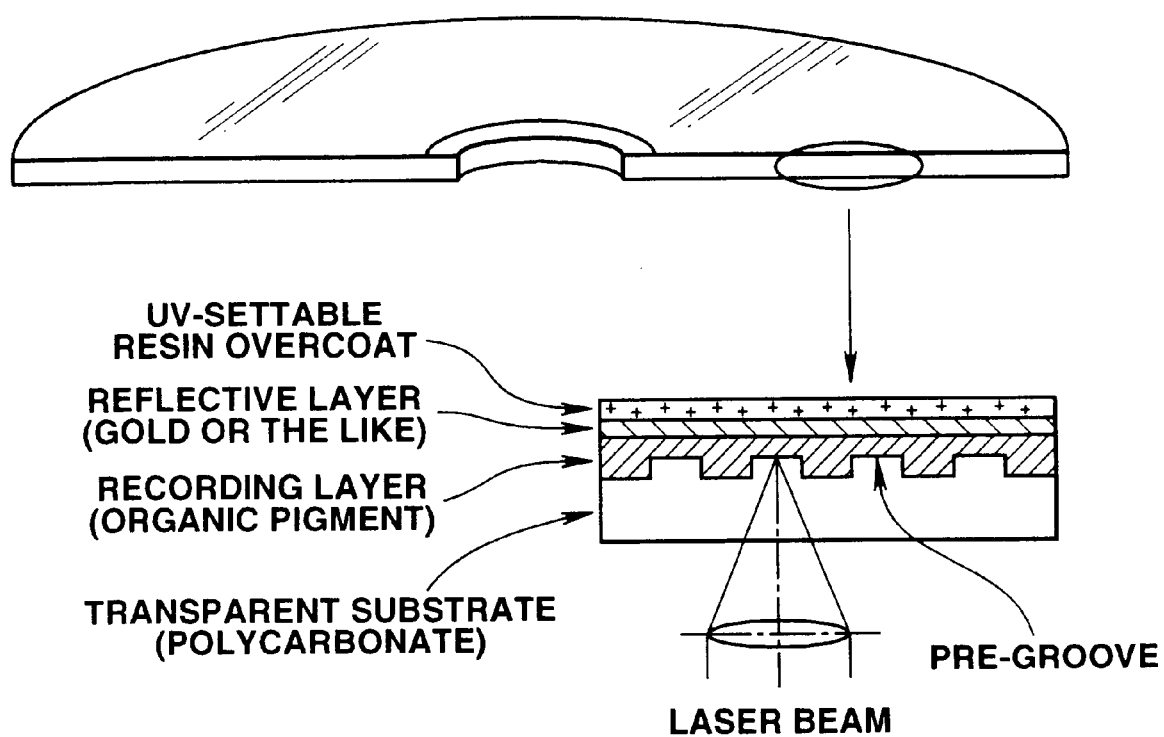
FIG. 2 is an explanatory drawing of an example of optical disc reproduced by the optical disc reproducing apparatus according to the present invention.

As shown in FIG. 2, the optical disc D has a structure consisting of a transparent polycarbonate substrate, a spin-coated organic-pigment recording layer formed on the substrate, a reflective layer formed on the recording layer, and a UV-settable resin overcoat formed on the recording layer. The reflective layer is formed by vacuum evaporation of gold or the like. The optical disc D has no pits but only guide grooves called "pre-grooves" formed in the recording layer. To reproduce the optical disc D, the optical disc reproducing apparatus 1 irradiates a laser beam along the pre-groove and detects, from a return beam, light components from the edges of the pre-groove (will be referred to as "edge component" hereinafter) for the tracking servo control.

Figure 3:
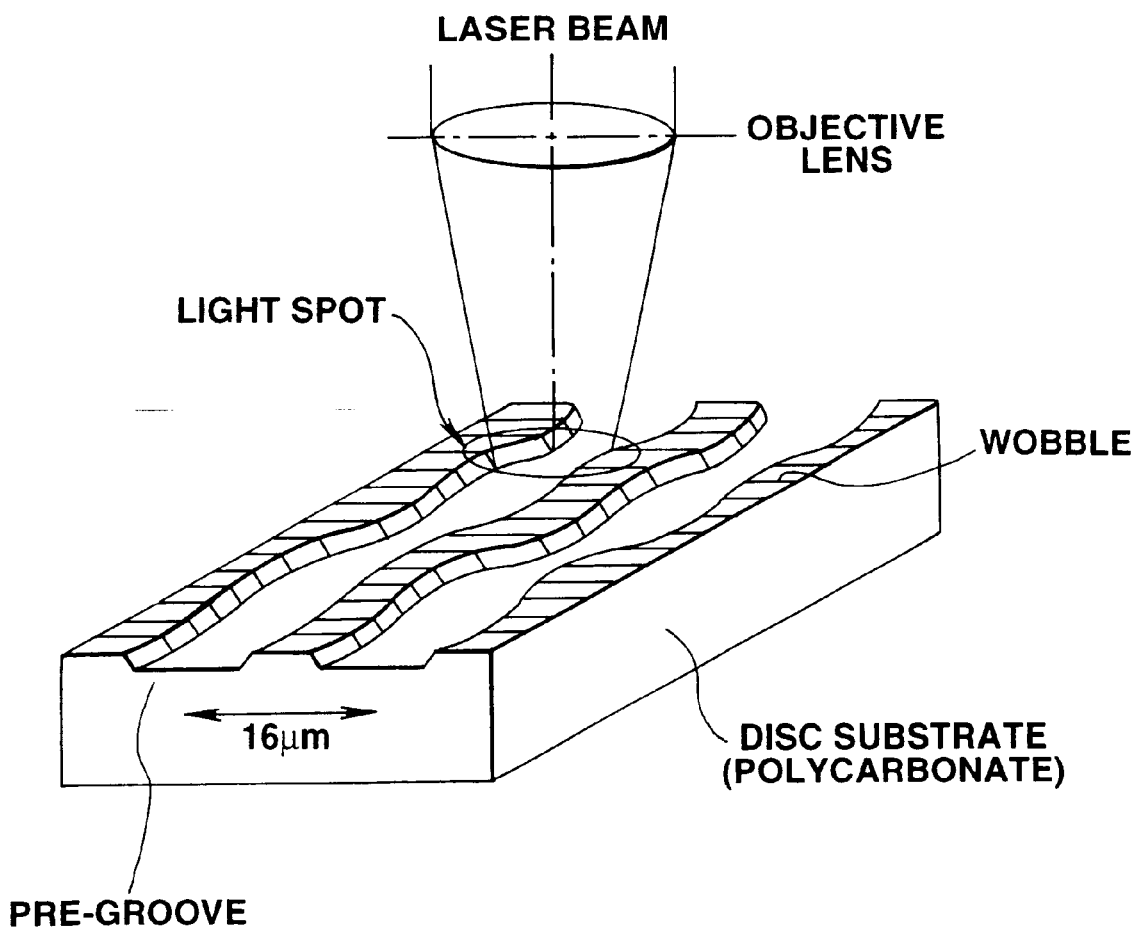
FIG. 3 is an explanatory drawing of the example of optical disc reproduced by the optical disc reproducing apparatus according to the present invention.

As shown in FIG. 3, the pre-grooves in the optical disc D are slightly meandering. The meandering pre-grooves are formed on the basis of a so-called wobble signal. The wobble signal is generated by FM modulation of a predetermined center frequency. The modulated component of the wobble signal is indicative of an absolute time information, namely, a physical address, of the optical disc D. It is called "ATIP (Absolute Time In-Pre-groove)". In the optical disc reproducing apparatus 1, ATIP is demodulated from the wobble signal and used to manage and identify recording locations, etc.

A data is recorded into the optical disc D by controlling the output intensity of a laser beam incident upon the disc on the basis of a logic (1 or 0) of the data. Namely, when the optical disc D has no data recorded therein, it has a high reflectance (in the order of 65 to 70%) over its entire surface. However, when a highly intense laser beam output is irradiated onto the optical disc D, the optical characteristic of the laser-irradiated portion of the optical disc D is changed by the heat of the laser beam to form a low-reflectance pit there. Therefore, pit trains as in a CD-ROM or the like, for example, in which pits are physically formed, can be formed on the optical disc D.

Also, the optical disc D has data recorded therein while being spun at a constant linear velocity in relation to the track. Furthermore, a wobble signal is also recorded as a pre-groove with the optical disc spun at a constant linear velocity correspondingly to the recorded data.

Next, the optical disc reproducing apparatus 1 will be described with reference to FIG. 1.

The optical disc reproducing apparatus 1 is adapted to reproduce data from the optical disc D (CD-R, for example) having data recorded thereon while being spun at a constant linear velocity, and a wobble signal recorded at the pre-grooves at the constant linear velocity while being spun at a constant angular velocity.

As shown in FIG. 1, the optical disc reproducing apparatus 1 comprises an optical pickup 11 which irradiates a laser beam onto the optical disc D and detects a reflected laser beam from the optical disc D, a matrix amplifier 12 which is supplied with a detected signal from the optical pickup 11 to generate a reproduction (RF) signal, a focus error (FE) signal, a tracking error (TE) signal and a wobble signal, an RF signal processor 13 which is supplied with the RF signal to transform the RF signal to a binary-coded data, a decoding unit 14 which demodulates the binary reproduction data and corrects an error, if any, and an interface controller 15 which sends the error-corrected reproduction data to a host computer and so on.

The optical disc reproducing apparatus 1 further comprises a sled motor 17 which moves the optical pickup 11 radially of the optical disc D on the basis of the FE and TE signals and an output signal from a frequency generator 16, a biaxial actuator 34 included in the optical pickup 11, and a servo processor 19 which controls the operation of a spindle motor 18 which drives to spin the optical disc D.

Further, the optical disc reproducing apparatus 1 comprises an ATIP demodulator 20 which detects an address data contained in a modulated component of the wobble signal.

The optical disc reproducing apparatus 1 also comprises a control microcomputer 21 which controls the decoding operation of the decoding unit 14, controls the servo processing operation of the servo processor 19, processes and controls data transmitted and received by the interface controller 15, processes an address data demodulated by the ATIP demodulator 20, and generates a set frequency signal for supply to the ATIP demodulator 20.

The optical pickup 11 irradiates a laser beam generated from a laser diode 31 onto a recording track on the optical disc D through an optical system 32, and detects a return light of the irradiated laser beam by means of a photodetector 33. Also, the above-mentioned biaxial actuator 34 of the optical pickup 11 moves an objective lens so that the laser beam irradiated onto the optical disc D is just focused on a spot and a track.

The matrix amplifier 12 is provided to convert a detection signal from the photodetector 33 to a voltage to generate RF, FE and TE signals. The RF signal is indicative of an information recorded on the optical disc D, and it is detected on the basis of a difference in reflectance between pits formed on the optical disc D. It is generated on the basis of a total amount of reflected light from the optical disc D, for example. The FE signal is detected on the basis of a difference in position between the focused position of the laser beam and recording layer of the optical disc D. It is generated by a so-called astigmatism. The TE signal is detected on the basis of a difference in position between the irradiated position of the laser beam on the optical disc D and center of the recording track on the optical disc D. It is generated by a so-called pushpull method which detects a signal indicative of a difference between reflected laser beams from opposite edges of the pre-groove.

As mentioned above, the matrix amplifier 12 converts a detection signal from the photodetector 33 to a voltage to generate a wobble signal by the so-called pushpull method which detects a signal indicative of a difference between reflected laser beams from opposite edges of the pre-groove, as for the TE signal. The wobble signal is different from the TE signal in that since it is used to detect a meandering component of the pre-groove, it has a component of a higher frequency than the component of the TE signal.

The RF signal is supplied from the matrix amplifier 12 to the RF signal processor 13, FE and TE signals are supplied to the servo processor 19, and the wobble signal is supplied to the ATIP demodulator 20.

The RF signal processor 13 encodes the RF signal to a binary data to reproduce a data and its clock recorded in the optical disc D. The binary reproduction data, etc. from the RF processor 13 are supplied to the decoding unit 14.

The decoding unit 14 comprises an EFM/CIRC decoder 35, CD-ROM decoder 36, buffer memory 37, etc. These circuits effect EFM (Eight Fourteen Modulation), error correction and data transformation to CD-ROM data format. The reproduction signal subjected to these kinds of processing in the decoding unit 14 is supplied to the interface controller 15.

The interface controller 15 transforms the reproduction data having been decoded in the decoding unit 14 to a predetermined format in which the data is to be transmitted, namely, to an SCSI format, for example. Also the interface controller 15 receives a control instruction, read file information, etc. from the host computer and supplies them to the control microcomputer 21.

The servo processor 19 comprises a focus/tracking servo circuit 38, sled servo circuit 39 and a spindle servo circuit 40. Thus it provides servo controls by means of these circuits during reproduction of the optical disc D.

The focus/tracking servo circuit 38 drives the biaxial actuator 34 of the optical pickup 11 on the basis of the FE and TE signals supplied from the matrix amplifier 12 so that the laser beams irradiated onto the optical disc D is just focused on a spot and a track. That is, the focus/tracking servo circuit 38 moves the objective lens for the FE signal to be zero and until the focused position of the laser beam falls precisely on the recording layer of the optical disc D. Also the focus/tracking servo circuit 38 moves the objective lens for the TE signal to be zero and until the laser spot incident upon the optical disc D falls precisely on the center of a recording track.

The sled servo circuit 39 drives the sled motor 17 on the basis of a DC component of the TE signal supplied from the matrix amplifier 12 and a sled feed signal supplied from the control microcomputer 21 until the optical pickup 11 is positioned over a predetermined recording track.

The sled motor 17 is provided to move the optical pickup 11 radially along the optical disc D. The optical pickup 11 is mounted on a sled mechanism, for example. The sled motor 17 drives the sled mechanism to move the optical pickup 11 mounted on the sled mechanism, to thereby move the laser-irradiated position from the innermost to outermost track on the optical disc D.

The sled servo circuit 39 moves the optical pickup 11 radially along the optical disc D on the basis of a DC component of the TE signal until the DC component becomes zero. Thereby, the sled servo circuit 39 can detect and control a DC component which cannot be controlled by the tracking servo control.

Also the sled servo circuit 39 moves the optical pickup 11 radially along the optical disc D on the basis of the sled feed signal supplied from the control microcomputer 21. The sled feed signal is indicative of a moved distance of the optical pickup 11 jumping from track to track when an address from which a data is to be reproduced is read from another address, for example. Namely, the control microcomputer 21 determines, from a physical address on the optical disc D from which a data is being read and a physical address on the optical disc D from which a data is to read next, a distance from a track to another over which the optical pickup 11 is to jump, and supplies the sled servo circuit 39 with a sled feed signal corresponding to the determined jump distance. The control microcomputer 21 judges, on the basis of an address data detected from the ATIP demodulator 20, a distance over which the optical pickup 11 has been moved in relation to the optical disc D, and stops supplying the sled feed signal when it judges that the optical pickup 11 has moved to a track of a destined physical address.

The spindle servo circuit 40 controls the spinning speed of the spindle motor 18 on the basis of a spinning speed information of the optical disc D, supplied from the frequency generator 16, so that the optical disc D spins at a constant angular velocity. The spindle motor 18 drives the optical disc D mounted on a turn-table, for example. The frequency generator 16 detects a speed of the optical disc D being spun.

As aforementioned, the servo processor 19 provides various kinds of servo control for a stable reproduction of data recorded in the optical disc D.

The ATIP demodulator 20 is supplied with the wobble signal to demodulate an address data included in a modulated component of the wobble signal. The address data includes an information on physical addresses on the optical disc D, and is supplied to the control microcomputer 21.

The control microcomputer 21 controls the decoding unit 14, servo processor 19, and so on, and it is also supplied with control instruction, etc. from the host computer via the interface controller 15.

The control microcomputer 21 monitors the operation of error correction, controls the pull-in operations of focus servo and tracking servo, and starts and stops the operation of the spindle motor 18 for driving to spin the optical disc D.

Also, the control microcomputer 21 determines, on the basis of a read instruction or the like from the host computer, a physical address from which a data to read exists on the optical disc D, and generates a sled feed signal. Based on a physical address from which a data is being read on the basis of the address data detected from the ATIP demodulator 20, the control microcomputer 21 generates a set frequency signal which is to be fed back to the ATIP demodulator 20. The set frequency signal is used to set each circuit constant in the ATIP demodulator 20.

Figure 4:
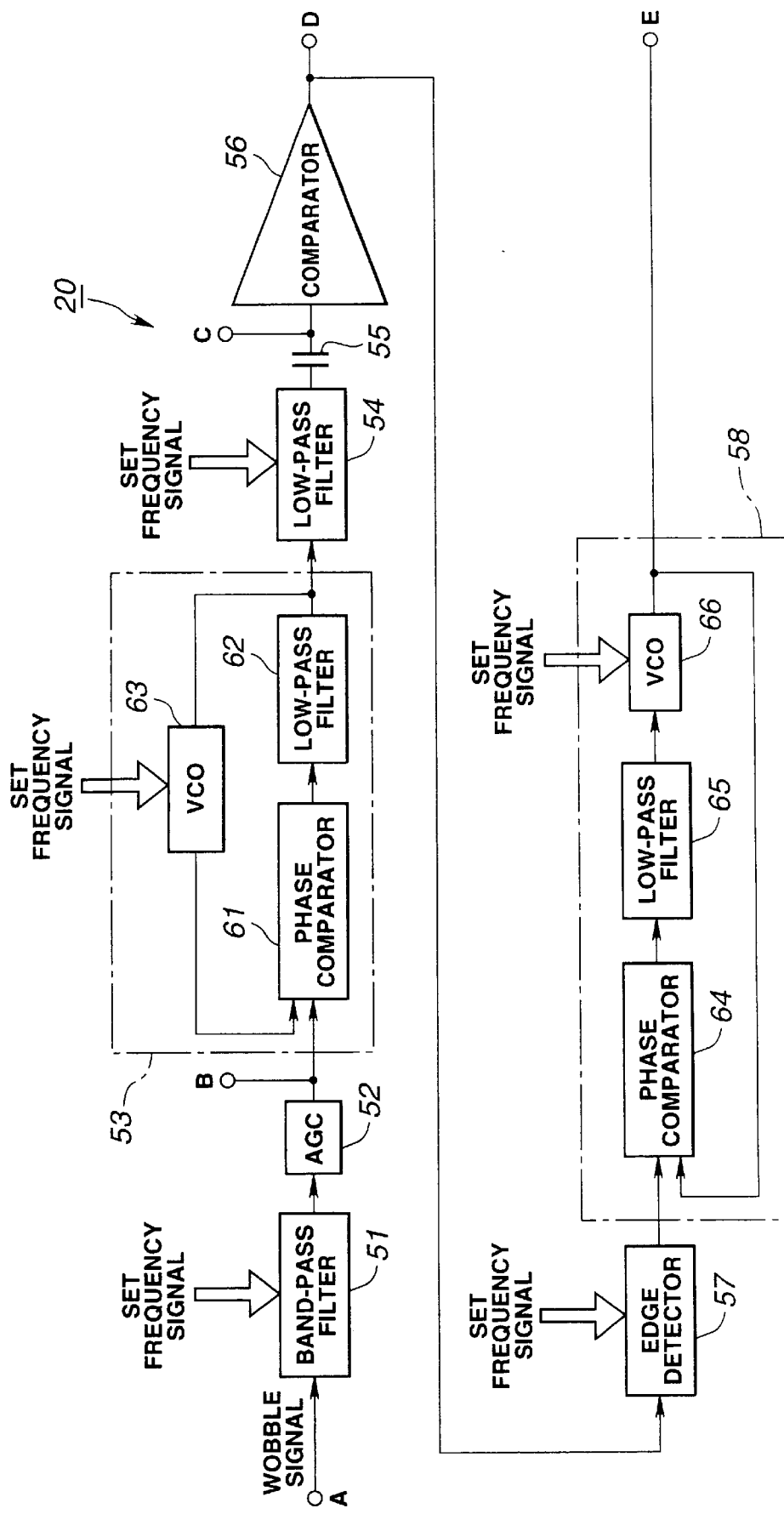
FIG. 4 is a block diagram of the ATIP demodulator used in the optical disc reproducing apparatus 1 according to the present invention.

Next, the ATIP demodulator 20 provided in the optical disc reproducing apparatus 1 will be described with reference to FIG. 4. Waveforms of signals developed at terminals A to E of the ATIP demodulator 20 are shown in FIG. 5.

Comprising a band-pass filter 51, automatic gain controller (AGC) 52, FM demodulating PLL (phase locked loop) circuit 53, low-pass filter 54, capacitor 55, and a comparator 56, the ATIP demodulator 20 detects an address data that is the modulated component of wobble signal. The ATIP demodulator 20 further comprises an edge detector 57 and clock regenerator PLL circuit 58 to reproduce a clock from the address data.

Supplied with a wobble signal as shown in FIG. 5A from the matrix amplifier 12, the band-pass filter 51 extracts a predetermined band component from the wobble signal to remove a noise component. The low- and high-band cut-off frequencies of the band-pass filter 51 are set with the set frequency signal supplied from the control microcomputer 21.

The AGC circuit 52 is supplied with a signal from the band-pass filter 51 to adjust the wobble signal to a predetermined amplitude as shown in FIG. 5B. Use of this AGC circuit 52 permits preventing output attenuation even when the wobble signal is off the middle between the low- and high-band cut-off frequencies of the band-pass filter 51. The output of this AGC circuit 52 is supplied to the FM demodulating PLL circuit 53.

In the FM demodulating PLL circuit 53, the phase comparator 61, low-pass filter 62 and VCO 63 form together a phase locked loop (PLL) to generate a carrier clock for a frequency-modulated wobble signal and provide an output signal indicative of a phase difference between the wobble signal carrier clock and the wobble signal. The VCO 63 changes the frequency of a clock output correspondingly to a voltage delivered from the low-pass filter 62. A frequency that is the center of the frequency variation is set with the set frequency signal supplied from the control microcomputer 21. Namely, the VCO 63 has a free-run frequency thereof changed with the set frequency signal.

The phase difference signal delivered from the FM demodulating PLL circuit 53 is supplied to the low-pass filter 54 and capacitor 55, which deliver a demodulated signal whose noise has been removed as shown in FIG. 5C. The cut-off frequency of the low-pass filter 54 is set with the set frequency signal supplied from the control microcomputer 21.

The comparator 56 is supplied with a demodulated signal from the capacitor 55, encodes it to a binary data and provides an address data as shown in FIG. 5D. The address data is a biphase modulated data, supplied to the control microcomputer 21 and then converted to a physical address information and so on.

The edge detector 57 is supplied with the binary address data from the comparator 56. The edge detector 57 detects leading and trailing edge components of the address data. The output from the edge detector 57 is supplied to the clock regenerator PLL circuit 58.

In the clock regenerator PLL circuit 58, a phase comparator 64, low-pass filter 65 and VCO 66 form together a phase locked loop (PLL) to generate a clock signal for address data as shown in FIG. 5E. The VCO 66 changes the frequency of a clock output correspondingly to a voltage delivered from the low-pass filter 65. A frequency that is the center of the frequency variation is set with the set frequency signal supplied from the control microcomputer 21. Namely, the VCO 66 has a free-run frequency thereof changed with the set frequency signal.

The ATIP demodulator 20 having the configuration described in the foregoing generates an address data and a clock signal for the address data, obtained by demodulating a wobble signal. The ATIP demodulator 20 supplies the generated address data and clock signal to the control microcomputer 21 in which the address data is decoded to detect a physical address information being currently reproduced. The control microcomputer 21 provides the various kinds of control on the basis of the physical address information.

The wobble signal supplied to the ATIP demodulator 20 has the center frequency thereof changed at each disc-radial position since the optical disc D having data recorded therein while being driven to spin at a constant linear velocity, is driven to spin at a constant angular velocity. Assume here that the center frequency of a wobble signal obtained by driving to spin the optical disc at a constant linear speed is 22.05 kHz, for example. In this case, if the signal along the inner perimeter of the optical disc D has a center frequency of 22.05 kHz when the optical disc D is driven to spin at a constant angular velocity, the signal along the outer perimeter has a center frequency of 55.125 kHz which is about 2.5 times higher than the signal along the inner perimeter.

Therefore, the band-pass filter 51 of the ATIP demodulator 20, VCO 63, low-pass filter 54, edge detector 57 and VCO 66 are set to optimum circuit constants, respectively, correspondingly to the center frequency of a wobble signal supplied to them, respectively. That is, the control microcomputer 21 determines, on the basis of the detected ATIP information, the moved position of the optical pickup 11 in the radial direction of an optical disc under reproduction. Then, the control microcomputer 21 determines, based on the moved position, thus determined, of the optical pickup 11, a relative linear velocity of the optical pickup 11 in relation to the optical disc, generates a set frequency signal and supplies it to each circuit in the ATIP demodulator 20.

For example, the center frequency between the low- and high-band cut-off frequencies of the band-pass filter 51 changes from 22.05 kHz to 55.125 kHz. The free-run frequency of the VCO 53 changes from 22.05 kHz to 55.125 kHz. The low-band cut-off frequency of the low-pass filter 54 changes from 3.15 kHz to 7.875 kHz. Also, the free-run frequency of the VCO 66 changes from 6.3 kHz to 15.75 kHz.

The optical disc reproducing apparatus 1 constructed as having been described in the foregoing functions as will be described herebelow for data reproduction from the optical disc D:

That is to say, in the optical disc reproducing apparatus 1, the spindle motor 18 drives the optical disc D at a constant angular velocity, and the optical pickup 11 reads a data recorded in the optical disc D. The data read from the optical disc D is subjected to a predetermined processing and transmitted from the interface controller 15 to the host computer.

Also in the optical disc reproducing apparatus 1, the control microcomputer 21 generates a set frequency signal on the basis of an address data demodulated by the ATIP demodulator 20 and an address information set for sled-feeding of the optical pickup 11, and supplies it to the ATIP demodulator 20. Namely, the control microcomputer 21 judges, based on the address information, a disc-radially moved position of the optical pickup 11, and identifies the linear velocity of the optical pickup 11 in that position in relation to the optical disc D. The control microcomputer 21 judges the center frequency of a wobble signal detected with the optical disc D driven to spin at the relative linear velocity, and changes the setting of each circuit in the ATIP demodulator 20 so that a modified component of the wobble signal of the center frequency can be detected.

In the optical disc reproducing apparatus 1, it is possible with the above operations to demodulate a wobble signal recorded in the optical disc D with the optical disc D driven to spin at a constant angular velocity the optical disc D having the wobble signal recorded therein while, being driven to spin at a constant linear velocity.

Therefore, the optical disc reproducing apparatus 1 needs no acceleration and deceleration of the spindle motor 18 which drives the optical disc D, and therefore can attain rapid access to the optical disc D. Also, since the spindle motor 18 needs no high torque, the optical disc reproducing apparatus 1 can be manufactured with less costs. Furthermore, the optical disc reproducing apparatus 1 can operate with less power consumption and less temperature rise.

In the optical disc reproducing apparatus and method according to the present invention, a set frequency is changed on the basis of a moved position of the optical pickup, the optical disc having data recorded thereon while being driven to spin at a constant linear velocity, is driven to spin at a constant angular velocity to demodulate a wobble signal recorded in the optical disc with a signal based on the set frequency signal as a carrier.

Thus, the optical disc reproducing apparatus needs no acceleration and deceleration of the spindle motor which drives the optical disc, and therefore can attain rapid access to the optical disc. Also, since the spindle motor needs no high torque, the optical disc reproducing apparatus can be manufactured with a reduced cost.

What is claimed is:

1. An optical disc reproducing apparatus, comprising:

means for driving at a constant angular velocity an optical disc in which a wobble signal, generated through frequency modulation of a predetermined center frequency signal by forming meandering pre-grooves for recording tracks, is recorded with the optical disc driven to spin at a constant linear velocity;

an optical pickup adapted to be movable radially of the optical disc;

means for demodulating, on the basis of a set frequency, the wobble signal detected by the optical pickup; and controlling means for changing the set frequency for the demodulating means on the basis of a disc-radially moved position of the optical pickup.

2. The apparatus claim 1 wherein the demodulating means includes an address FM demodulator which demodulates an address data from the wobble signal with a first set frequency taken as the center frequency, and a clock regenerator which reproduces a clock from the address data with a second set frequency taken as the center frequency;

the controlling means changes the first and second set frequencies on the basis of a disc-radially moved position of the optical pickup.

3. The apparatus claim 2 wherein the controlling means detects the disc-radially moved position of the optical pickup on the basis of the address data.

4. An optical disc reproducing method for reproducing a signal recorded in an optical disc with the optical disc driven to spin at a constant angular velocity, comprising the steps of:

driving, at a constant angular velocity, an optical disc in which a wobble signal, generated through frequency modulation of a predetermined center frequency signal by forming meandering pre-grooves for recording tracks, is recorded with the optical disc driven to spin at a constant linear velocity based on a set frequency;

demodulating the wobble signal on the basis of a set frequency; and changing the set frequency of the demodulating step on the basis of a disc-radially moved position of an optical pickup.

5. The method of claim 4 wherein said changing step includes changing first and second set frequencies on the basis of a disc-radially moved position of the optical pickup in the step of changing the set frequency; and said demodulating step includes demodulating an address data modulated to a wobble signal with the first set frequency taken as the center frequency; and processing the address data to regenerate a clock for the address data with the second set frequency taken as the center frequency.

6. The method of claim 5 further comprising the step of:

detecting a position of the optical pickup in the radial direction of the optical disc on the basis of the address data.

7. An optical disc reproducing apparatus, comprising:

a driving unit for driving at a constant angular velocity an optical disc in which a wobble signal, generated through frequency modulation of a predetermined center frequency signal by forming meandering pre-grooves for recording tracks, is recorded with the optical disc driven to spin at a constant linear velocity;

an optical pickup adapted to be movable radially of the optical disc;

a demodulator for demodulating, on the basis of a set frequency, the wobble signal detected by the optical pickup; and a controller for changing the set frequency for the demodulator on the basis of a disc-radially moved position of the optical pickup.

8. The apparatus claim 7 wherein the demodulator includes:

an address FM demodulator which demodulates an address data from the wobble signal with a first set frequency taken as the center frequency; and a clock regenerator which reproduces a clock from the address data with a second set frequency taken as the center frequency;

wherein the controller changes the first and second set frequencies on the basis of a disc-radially moved position of the optical pickup.

9. The apparatus claim 8 wherein the controller detects the disc-radially moved position of the optical pickup on the basis of the address data.

* * * * *

UNITED STATES PATENT AND TRADEMARK OFFICE
CERTIFICATE OF CORRECTION

PATENT NO. : 6,246,649 B1
DATED : June 12, 2001
INVENTOR(S) : Shinji Ohta et al.

It is certified that error appears in the above-identified patent and that said Letters Patent is hereby corrected as shown below:

Column 1,
Line 41, delete "a" (first occurrence);
Line 42, change ", etc." to -- and so on --; and
Line 45, delete "a".

Column 2,
Line 4, change "drives" to -- drive --;
Line 5, change ", etc." to -- and so on --;
Line 36, after "based" insert -- on --;
Line 39, delete "-"; and
Line 62, change "intention" to -- invention --.

Column 3,
Line 10, change "shows" to -- show --; and
Line 52, change ", etc." to -- and so on --.

Column 5,
Line 33, after "Thus" insert a comma; and
Line 43, after "Also" insert a comma.

Column 6,
Line 36, change "etc." to -- and so on --.

Column 8,
Line 15, change "correspondingly" to -- corresponding --;
Line 62, after "D" (first occurrence), insert a comma;
Line 63, after "velocity" insert a comma; and
Line 64, delete ",".

Signed and Sealed this

Sixteenth Day of April, 2002

Attest:

*Attesting Officer*

JAMES E. ROGAN
*Director of the United States Patent and Trademark Office*